(12) United States Patent
Yagnik et al.

(10) Patent No.: US 8,798,438 B1
(45) Date of Patent: Aug. 5, 2014

(54) AUTOMATIC VIDEO GENERATION FOR MUSIC PLAYLISTS

(71) Applicant: Google Inc., Mountain View, CA (US)

(72) Inventors: Jay Yagnik, Mountain View, CA (US); Douglas Eck, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/708,647

(22) Filed: Dec. 7, 2012

(51) Int. Cl.
*H04N 5/92* (2006.01)

(52) U.S. Cl.
USPC .......................................... 386/241; 386/248

(58) Field of Classification Search
None
See application file for complete search history.

(56) References Cited

U.S. PATENT DOCUMENTS

| | | | |
|---|---|---|---|
| 7,668,842 B2 * | 2/2010 | LaChapelle et al. | 707/803 |
| 7,853,344 B2 * | 12/2010 | Khan et al. | 700/94 |
| 2007/0234215 A1 | 10/2007 | Graham et al. | |
| 2009/0063414 A1 | 3/2009 | White et al. | |
| 2011/0090249 A1 | 4/2011 | Sheba et al. | |

FOREIGN PATENT DOCUMENTS

WO 2012010510 A1 1/2012

OTHER PUBLICATIONS

WSABIE: Scaling Up to Large Vocabulary Image Annotation, J. Weston et al.
An Online Algorithm for Large Scale Image Similarity Learning, G. Chechik et al.

* cited by examiner

*Primary Examiner* — William C Vaughn, Jr.
*Assistant Examiner* — Eileen Adams
(74) *Attorney, Agent, or Firm* — Morris & Kamlay LLP

(57) ABSTRACT

A computing system may process a plurality of audiovisual files to determine a mapping between audio characteristics and visual characteristics. The computing system may process an audio playlist to determine audio characteristics of the audio playlist. The computing system may determine, using the mapping, visual characteristics that are complementary to the audio characteristics of the audio playlist. The computing system may search a plurality of images to find one or more image(s) that have the determined visual characteristics. The computing system may link or associate the one or more image(s) that have the determined visual characteristics to the audio playlist such that the one or more images are displayed on a screen of the computing device during playback of the audio playlist.

20 Claims, 5 Drawing Sheets

US 8,798,438 B1

AUTOMATIC VIDEO GENERATION FOR MUSIC PLAYLISTS

TECHNICAL FIELD

Aspects of the present application relate to digital multimedia processing. More specifically, to a method and system for automatic video generation for music playlists.

BACKGROUND

Existing methods for finding and consuming digital multimedia content can be inefficient and lead to suboptimal user experiences. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

A method and/or system is provided for automatic image generation for music playlists, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "module" refers to functions than can be performed by one or more circuits. As utilized herein, the terms "e.g.," and "for example" set off lists of one or more non-limiting examples, instances, or illustrations.

Figure 1:
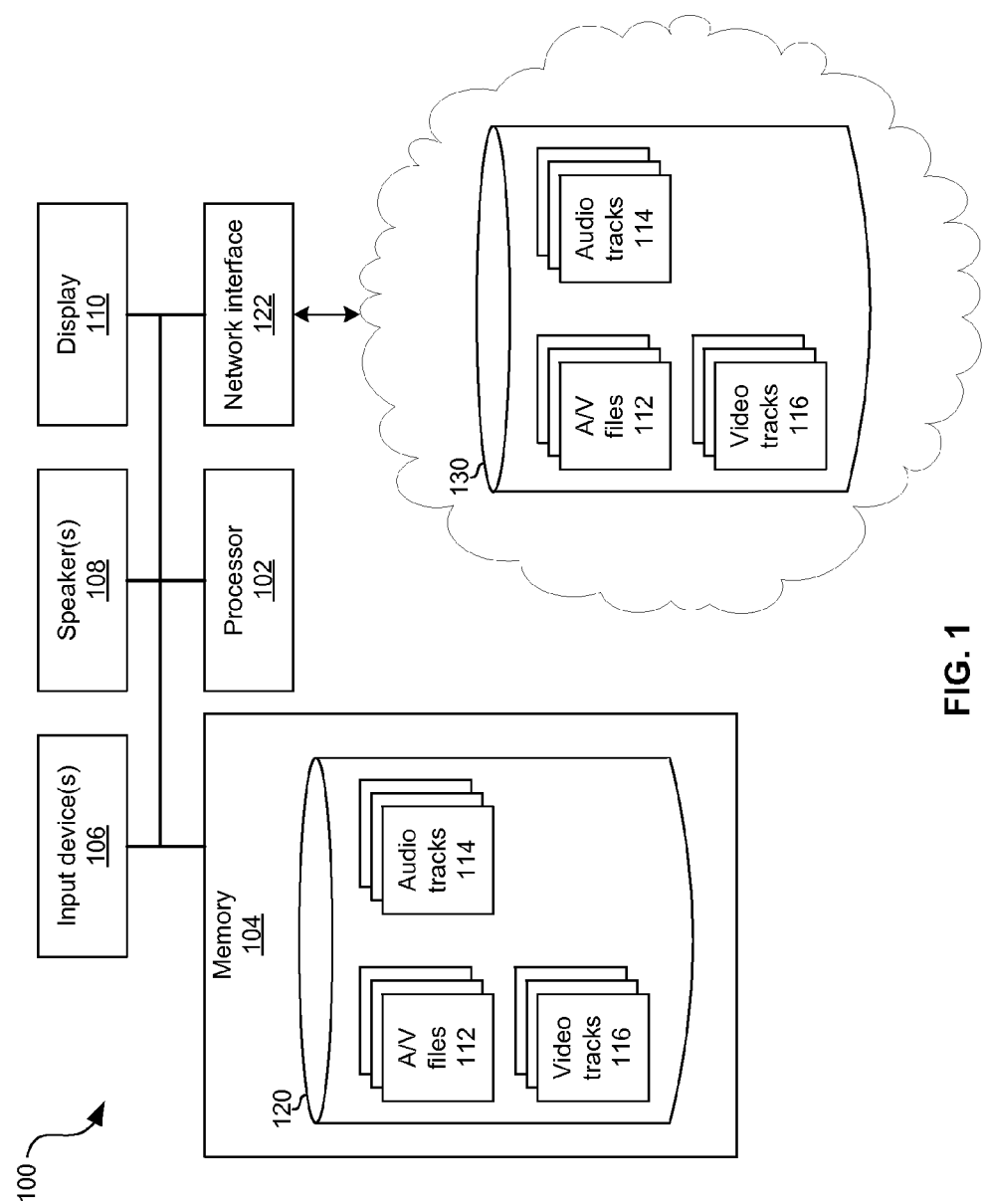
FIG. 1 depicts an example computing system operable to process digital multimedia content in accordance with an implementation of this disclosure.

FIG. 1 depicts an example computing system operable to process digital multimedia content in accordance with an implementation of this disclosure. The example computing system 100 comprises a processor 102, memory 104, input devices 106, speakers 108, a display 110, and a networking interface 122. The computing system may comprise, for example, one or more instances of one or more of the following: a personal computer, a laptop, a smartphone, a tablet computer, and a server. For example, the computing system 100 may comprise a personal computer and a smartphone, with user input being provided from the smartphone to the personal computer.

The processor 102 may, for example, comprise a single or multi-core processor, an application specific integrated circuit (ASIC), field programmable gate array (FPGA), and/or any other suitable circuitry. The processor 102 may be operable to effectuate the operation of the computing system by executing lines of code stored in the memory 104. The lines of code may include an operating system and one or more applications. Execution of the code by the processor 102 may cause the computing system 100 to perform processes such as those described below with reference to FIGS. 2A-4B, including media processing for output to speaker(s) 108, display 110, media analysis, and playlist generation based on media analysis.

The memory may, for example, comprise non-volatile memory, volatile memory, read only memory (ROM), random access memory (RAM), flash memory, magnetic storage, and/or any other suitable memory. The memory 104 may comprise program memory, run-time memory, and mass storage. Program memory may store lines of code executable by the processor 102 to effectuate operation of the operating system and one or more applications. Runtime memory may store data generated and/or used during execution of the OS and/or applications. Mass storage may store any number and/or types of files including media files. In the example implementation depicted, the mass storage may function as a repository 120 that stores one or more audiovisual files 112, one or more audio tracks 114, one or more videos 116.

The network interface 122 may comprise circuitry operable to communicate over one or more network links in accordance with one or more network protocols such as, for example, Ethernet, DOCSIS, DSL, Fibre Channel Protocol, and/or any other suitable protocol. In the example implementation depicted, the network interface 122 couples a cloud-based repository 130 to the rest of the system 100, and the repository 130 stores one or more audiovisual files 112, one or more audio tracks 114, one or more videos 116.

The input device(s) 106 may comprise, for example, a mouse, a touchpad, a motion sensor, a trackball, a voice recognition device, a keyboard, and/or any other suitable input device which enables a user to interact with the computing system 100.

The speaker(s) 108 may receive analog audio signals and convert them to acoustic signals. The display 110 may receive pixel data from the processor 102 and convert it to a human-viewable image. The display may be, for example, a liquid crystal display (LCD) screen, an organic light emitting diode (OLED) screen, an e-ink screen, and/or any other suitable device for presenting a graphical user interface.

Each audio track 114 may comprise any type of audio including music, sound effects, and/or spoken word. Audio tracks 114 may be stored in files having suitable formats such as, for example, .mp3 and .wav. One or more audio tracks 114 may be associated with one another (e.g., stored as a single file and/or associated via an XML file) to form an audio playlist. In some instances, an audio playlist may comprise a single audio track 114.

Each video 116 may comprise one or more video frames with each frame comprising a photographic and/or computer-generated image. (For purposes of this disclosure, a video 116 having a single frame is equivalent to a still image.) Videos 116 may be stored in files having suitable formats such as, for example, .mov, .mp4, .avi, and .wmv, .jpg, .gif, and .png. One or more videos 116 may be associated with one another (e.g., stored as a single file and/or associated via an XML file) to form a video playlist. In some instances, a video playlist may comprise a single video 116.

Each audiovisual file 112 may comprise an audio portion and a video portion. The audio portion of an audiovisual file 112 may comprise any type of audio including music, sound effects, and/or spoken word. The video portion of an audiovisual file 112 may comprise one or more videos. Example file formats of the audiovisual files include .mov, .mp4, .avi, and .wmv.

Figure 2:
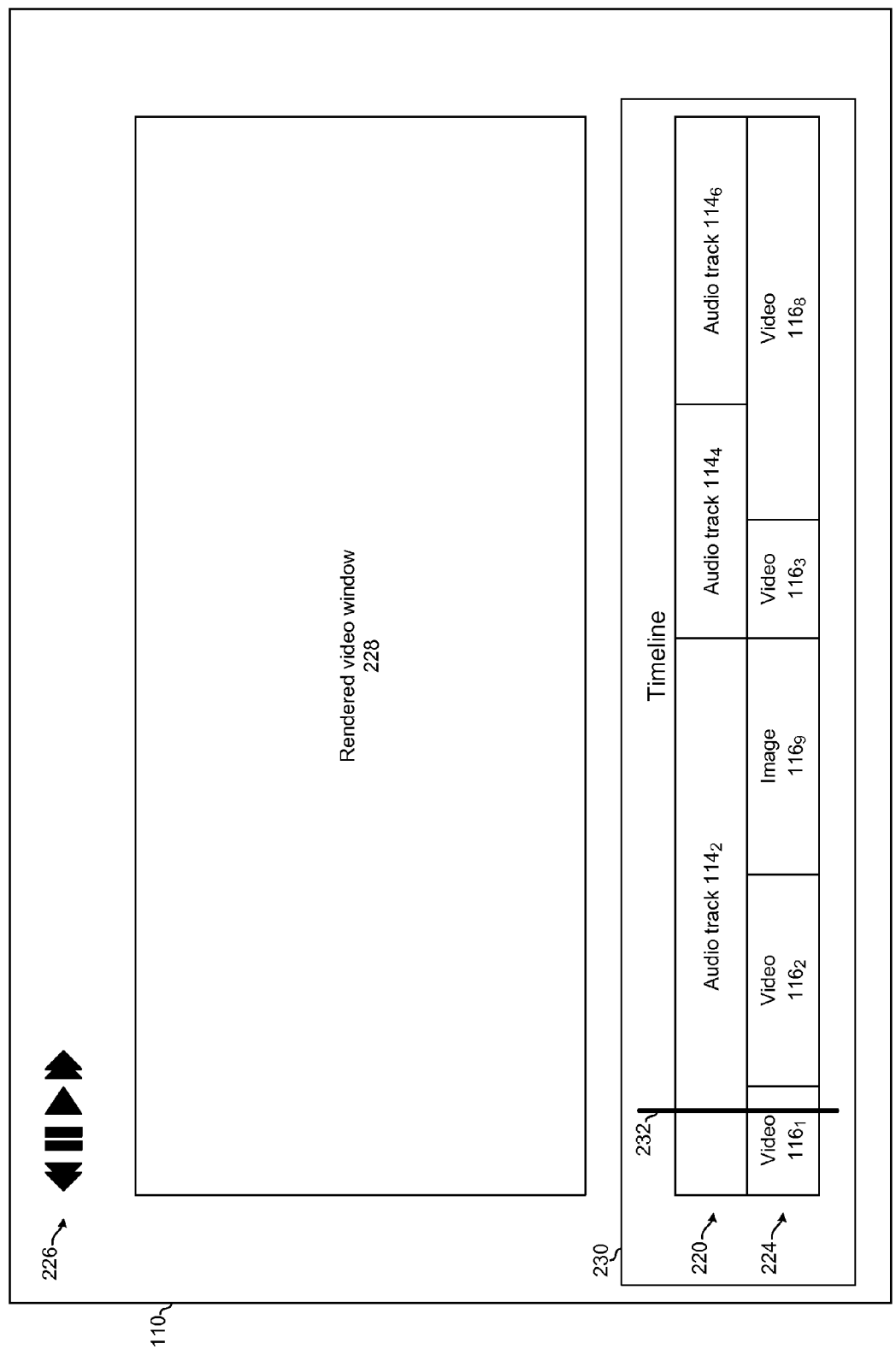
FIG. 2 depicts an example media player application concurrently playing an audio playlist and a video playlist.

FIG. 2 depicts an example media player application concurrently playing an audio playlist and a video playlist. FIG. 2 shows an example graphical user interface (GUI) of a media application running on the computing system 100. The GUI comprises controls 226 for rewinding, fast-forwarding, playing, and pausing playback of media. The GUI also comprises a window 228 via which video is presented for user viewing and a timeline window 230 showing the audio and video playlists currently selected for playback. Part of the timeline window 230 is a playback progress indicator 232 that points to the portion of the audio playlist 220 and the portion of the video playlist 224 that is currently being played.

Still referring to FIG. 2, the audio playlist 220 is being played (processed to recover audio samples which are subsequently converted to analog and conveyed to the speaker(s) 108) and a corresponding video playlist 224 is being concurrently played (processed to recover pixel data which is subsequently conveyed to the display 110). The audio playlist 220 comprises audio tracks $114_2$, $114_4$, and $114_6$. The video playlist 224 comprises videos $116_1$, $116_2$, $116_9$, $116_3$, and $116_8$.

In an example implementation where the audio playlist 220 was selected for playback by a user of the computing system 100, the videos $116_1$, $116_2$, $116_9$, $116_3$, and $116_8$ may have been selected and/or generated to accompany the audio playlist 220 as described below with reference to FIG. 3A. In such an implementation, the location of a particular one of the videos $116_1$, $116_2$, $116_9$, $116_3$, and $116_8$ may be synchronized to a particular point of the audio playlist 220 having audio characteristics that map to the visual characteristics of that particular video.

In the case where the video playlist 224 was selected for playback by a user of the computing system 100, the audio tracks $116_2$, $116_4$, and $116_6$ may have been selected and/or generated to accompany the video playlist 224 as described below with reference to FIG. 3B. In such an implementation, the location of a particular one of the audio tracks $114_2$, $114_4$, and $114_6$ may be synchronized to a particular point of the video playlist 224 having visual characteristics that map to the audio characteristics of that particular audio track.

Figure 3A:
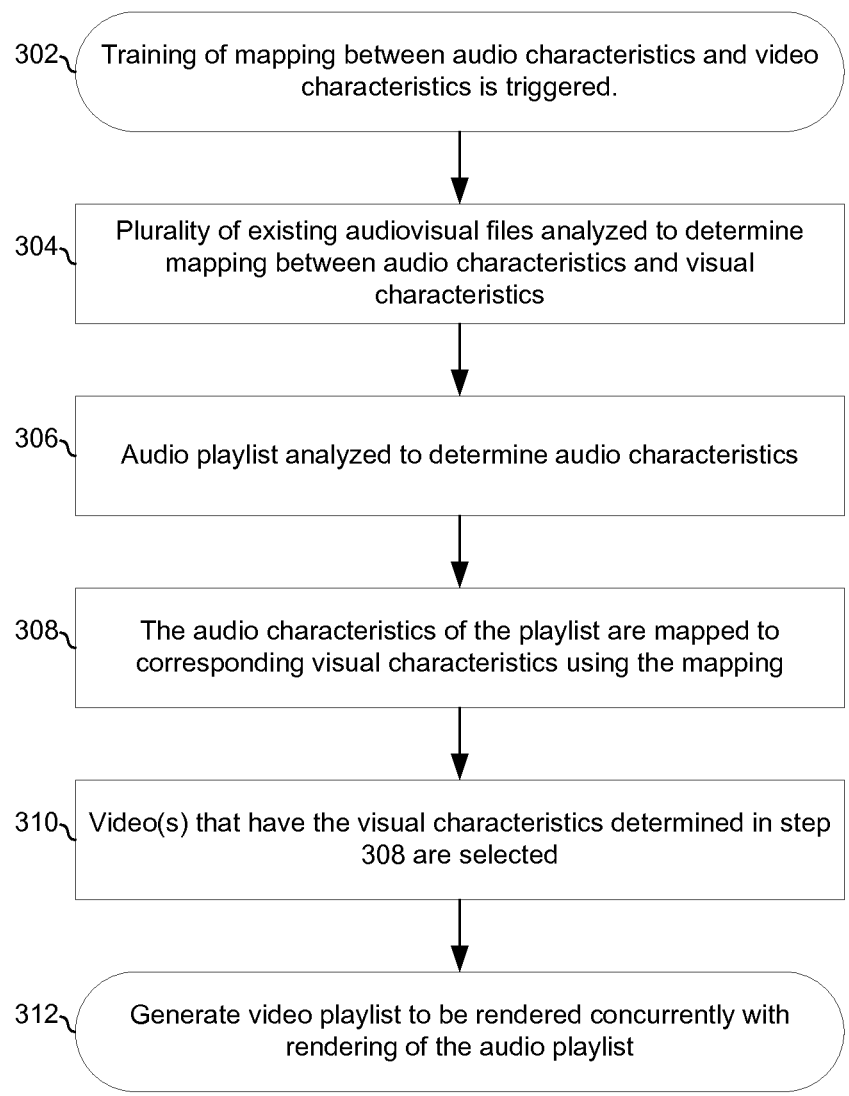
FIG. 3A depicts an example process for generating or selecting a video playlist to accompany an audio playlist, in accordance with an implementation of this disclosure.

FIG. 3A depicts an example process for generating or selecting a video playlist to accompany an audio playlist, in accordance with an implementation of this disclosure. The process begins with block 302 in which a training of a mapping between audio characteristics and visual characteristics is triggered.

The mapping may enable determining which visual characteristics are complementary to which audio characteristics. That is, given an audio playlist having determined audio characteristics, the mapping may identify visual characteristics that are complementary to the characteristics of the audio playlist. An audio playlist and video playlist may be complementary in that, for example, they have a similar style and/or create a similar mood or impression in the viewer/listener. For example, an audio playlist determined to be "peaceful" may be mapped to one or more video(s) having imagery and/or colors associated with peacefulness (e.g., a sun setting on a calm lake). In an example implementation, an audio characteristic and a video characteristic may be determined to be complementary where a dot-product of their respective audio and visual vectors is below a threshold.

In an example implementation, determining the mapping may comprise performance of a supervised machine learning algorithm performed on training data.

An example machine learning algorithm is Wsabie, which learns an embedding of audio and/or video features such that scoring those embeddings against one another by taking their dot product or cosine distance may lead to a similarity ranking. That is, Wsabie performs gradient descent learning on training data to generate embeddings with numerical properties such that two vectors close to each other in dot-product or cosine-distance space are similar with respect to our training criteria.

Another example machine learning algorithm is the Online Algorithm for Scalable Image Similarity Learning (OASIS), which uses an unconstrained bilinear similarity. Specifically, given two images p1 and p2 similarity is measured through a bilinear form p1 Wp2, where the matrix W is not required to be positive, or even symmetric. Furthermore, OASIS uses a sparse representation of the images, which allows computing similarities very fast. Additionally, OASIS is an online dual approach based on the passive-aggressive algorithm that minimizes a large margin target function based on the hinge loss, and converges to high quality similarity measures after being presented with a small fraction of the training pairs.

Determining audio characteristics of an audio playlist may comprise, for example, processing the audio playlist to generate and/or recover audio samples and analyzing the audio samples to determine and/or generate a stabilized auditory image, Mel-frequency cepstral coefficients, and/or a spectrogram. In addition to, or as an alternative to, analyzing the audio samples to determine audio characteristics, one or more audio characteristics may be determined from metadata (e.g., musical genre, musical mood, artist, and/or album title labels) associated with the audio playlist. In an example implementation, the audio characteristics may be derived, non-invertible characteristics from which reconstruction of the audio playlist or its constituent audio may not be possible.

Determining visual characteristics of a video playlist may comprise, for example, processing the video playlist to generate and/or recover pixel data and analyzing the pixel data to determine and/or generate color descriptors (e.g., color histograms and/or color textons) and/or local features describing interest points in one or more frames of the video. In addition to, or as an alternative to, analyzing the pixel data to determine visual characteristics, one or more visual characteristics may be determined from metadata (e.g., musical genre, musical mood, artist, and/or album title labels) associated with the video playlist. In an example implementation, the visual characteristics of a video playlist may be derived, non-invertible characteristics from which reconstruction of the video playlist or its constituent video may not be possible.

In block 304, the training is performed. The training of the mapping may comprise, for example, processing a large set of audiovisual files 112. Each audiovisual file 120 may comprise both an audio portion and a video portion and may reside in the local repository 120 and/or the remote repository 130. The audiovisual files may be processed in accordance with one or more algorithms to determine audio characteristics of the audio portion and visual characteristics of the video portion. The determined audio characteristics and visual characteristics may then be analyzed to which audio characteristics are complementary to which visual characteristics and visa-versa. In this regard, assuming the set of audiovisual files is sufficiently large and diverse, the fact that certain audio characteristics are typically or frequency accompanied by certain visual characteristics in the set of audiovisual files may lead to a decision that those certain audio characteristics are complementary to those certain visual characteristics.

In block 306, an audio playlist 220 (FIG. 2) comprising one or more of the audio tracks 114 stored in repository 120 or repository 130 is analyzed to determine its audio characteristics. The analysis may comprise first processing the track(s) 114 of the audio playlist to recover and/or generate audio samples and then analyzing the audio samples. Additionally or alternatively, the analysis may comprise inspecting metadata (e.g., musical genre, musical mood, artist, and/or album title labels) associated with the audio playlist 220.

In block 308, audio characteristics determined in block 306 are mapped to corresponding visual characteristics using the mapping trained in block 304.

In block 310, the repository 120 and/or the repository 130 may be searched for one or more videos that have the visual characteristics determined in block 308. Additionally or alternatively, in an example implementation, one or more videos having the visual characteristics determined in block 308 may be generated. In an example of such an implementation, an algorithm like graph cuts may be used to make up a single consensus video. In another example of such an implementation, parametric generative models for those videos may be built using, for example, Gaussian mixture modeling. In this manner, a composite (possibly somewhat-abstract looking) video that is complementary to at least a portion of the audio playlist may be generated.

In block 312, a video playlist 324 (FIG. 3) may be generated from the video(s) selected and/or generated in block 310. The generated video playlist 224 may be linked to the audio playlist 220 (e.g., via metadata and/or an XML file) and/or combined with the audio playlist 220 into a single audiovisual file. In this manner, a user interacting with the computing system 100 to trigger playback of the audio playlist 220 via the speaker(s) 108 may automatically trigger concurrent playback of the generated video playlist 224 via the display 110. In an example implementation, constituent videos of the video playlist 224 may be synchronized to particular points of the audio playlist 220.

Figure 3B:
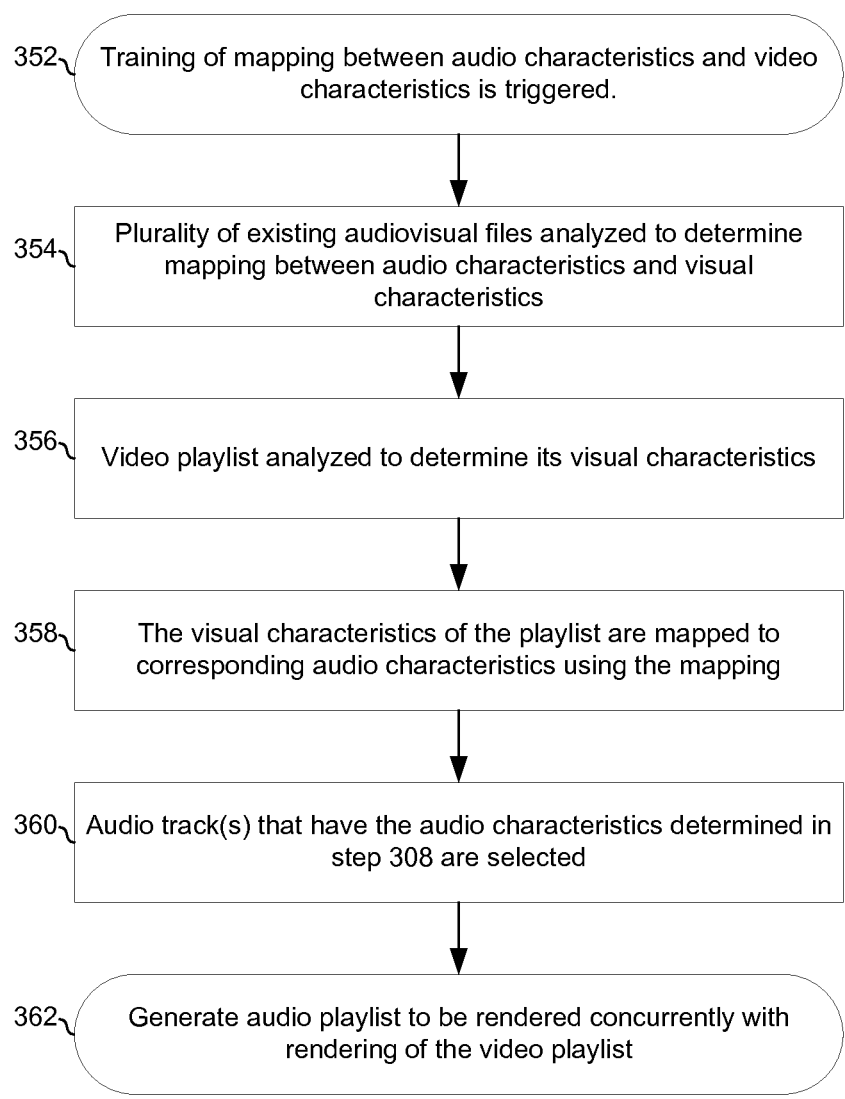
FIG. 3B depicts an example process for generating or selecting an audio playlist to accompany a video playlist, in accordance with an implementation of this disclosure.

FIG. 3B depicts an example process for generating or selecting an audio playlist to accompany a video playlist, in accordance with an implementation of this disclosure. The process begins with block 352 in which a training of a mapping between audio characteristics and visual characteristics is triggered.

The mapping may enable determining which audio characteristics are complementary to which visual characteristics. That is, given a video playlist having determined visual characteristics, the mapping may identify audio characteristics that are complementary to the characteristics of the video playlist. An audio playlist and video playlist may be complementary in that, for example, they have a similar style and/or create a similar mood or impression in the viewer/listener. For example, a video playlist portraying a car race may be mapped to one or more audio tracks having a fast tempo and/or other high-energy characteristics (e.g., a rock and roll song). In an example implementation, an audio characteristic and a video characteristic may be determined to be complementary where a dot-product of their respective audio and visual vectors is below a threshold.

In block 354, the training is performed. The training of the mapping may comprise, for example, processing a large set of audiovisual files 112. Each audiovisual file 120 may comprise both an audio portion and a video portion and may reside in the local repository 120 and/or the remote repository 130. The audiovisual files 120 may be processed in accordance with one or more algorithms to determine audio characteristics of the audio portion and visual characteristics of the video portion. The determined audio characteristics and visual characteristics may then be analyzed to determine which audio characteristics are complementary to which visual characteristics and visa-versa. In this regard, assuming the set of audiovisual files is sufficiently large and diverse, the fact that certain audio characteristics are typically or frequency accompanied by certain visual characteristics in the set of audiovisual files may lead to a decision that those certain audio characteristics are complementary to those certain visual characteristics.

In block 356, a video playlist 220 (FIG. 2) comprising one or more of the videos 116 is analyzed to determine its visual characteristics. The analysis may comprise first processing the video(s) to generate and/or recover pixel data and then analyzing the pixel data. Additionally or alternatively, the analysis may comprise inspecting metadata (e.g., musical genre, musical mood, artist, and/or album title labels) associated with the video playlist 220.

In block 358, visual characteristics determined in block 356 are mapped to corresponding audio characteristics using the mapping trained in block 354.

In block 360, the repository 120 and/or the repository 130 may be searched for one or more audio tracks 114 that have the audio characteristics determined in block 358. Additionally or alternatively, one or more audio tracks 114 having the audio characteristics determined in block 358 may be generated.

In block 362, an audio playlist 324 (FIG. 2) may be generated from the audio track(s) selected and/or generated in block 360. The generated audio playlist 224 may be linked to the video playlist 220 (e.g., via metadata and/or an XML file) and/or combined with the audio playlist 220 into a single audiovisual file. In this manner, a user interacting with the computing system 100 to trigger playback of the video playlist 220 via the display 110 may automatically trigger concurrent playback of the generated audio playlist 224 via the speaker(s) 108. In an example implementation, constituent audio tracks 114 of the audio playlist 224 may be synchronized to particular points of the video playlist 220.

Figure 4A:
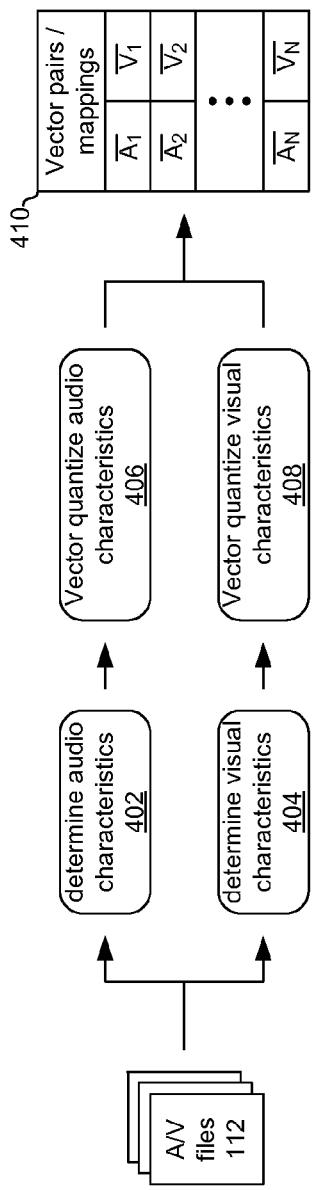
FIGS. 4A and 4B illustrate example processes in which vector quantization is used for generating and/or selecting a video playlist to accompany an audio playlist.
Figure 4B:
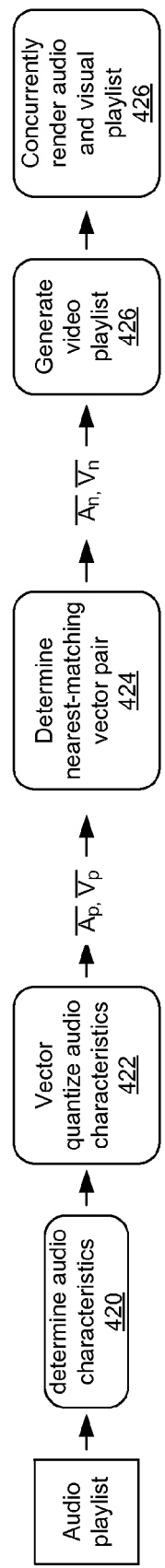

FIGS. 4A and 4B illustrate an example process in which vector quantization is used for generating and/or selecting a visual playlist to accompany an audio playlist. Referring to FIG. 4A, a plurality of audiovisual files 112 are analyzed, in block 402, to determine their audio characteristics. Similarly, the audiovisual files 112 are analyzed, in block 404, to determine their visual characteristics. In block 406 the determined audio characteristics may be vector quantized. In block 408 the determined visual characteristics may be vector quantized. The vector quantization may be done in such a way that the resulting vector pairs can be searched by audio characteristics to return complementary visual characteristics and/or searched by visual characteristics to return complementary audio characteristics. The vector quantization may use a "winner-take-all" (WTA) algorithm, a K-Means algorithm, and/or any other suitable vector quantization algorithm. The result of blocks 406 and 408 may be a data structure 410 storing a plurality of vector pairs, each vector pair comprising an audio vector and a visual vector.

Now referring to FIG. 4B, which occurs after FIG. 4A, an audio playlist comprising one or more audio tracks is analyzed, in block 420, to determine its audio characteristics. The algorithm(s) used in block 420 may be the same algorithms used in block 402 of FIG. 4A. In block 422, the audio characteristics of the audio playlist 220 may be vector quantized. The resulting playlist audio vector is $A_p$. The algorithm(s) used in block 422 may be the same algorithms used in block 406 of FIG. 4A. In block 424, the data structure 410 may be searched for the vector pair whose audio vector is a nearest match for $\overline{A_p}$. This search returns the vector pair $[\overline{A_n}, \overline{V_n}]$. That is, the $\overline{A_n}$ is the nearest match for $\overline{A_p}$ in the mapping 110. In block 426, a repository is searched for the video(s), image(s), and/or graphic(s) that have visual characteristics best matching $\overline{V_n}$, and the found video(s), image(s), and/or graphic(s) are used to create the visual playlist 224. In block 426, playback of the audio playlist 220 triggers concurrent playback of the visual playlist 224.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for automatic video generation for music playlists.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method comprising:
   in a computing system:
      processing a plurality of audiovisual files to determine a mapping between audio characteristics and visual characteristics;
      processing an audio playlist to determine audio characteristics of the audio play list;
      determining, using the mapping, visual characteristics that are complementary to the audio characteristics of the audio play list;
      searching a plurality of videos to find one or more videos that have the determined visual characteristics that are complementary to the audio characteristics of the audio play list; and
      displaying, during playback of the audio play list, the one or more videos that have the determined visual characteristics that are complementary to the audio characteristics of the audio play list.

2. The method of claim 1 wherein the processing of the plurality of audiovisual files to determine the mapping comprises vector quantizing audio characteristics and visual characteristics of the plurality of audiovisual files to generate a plurality of first vectors.

3. The method of claim 2, wherein the determining visual characteristics that are complementary to the audio characteristics of the audio playlist using the mapping comprises vector quantizing the determined audio characteristics of the audio playlist to generate a second vector.

4. The method of claim 2, wherein the determining, using the mapping, the visual characteristics that are complementary to the audio characteristics of the audio playlist comprises searching the plurality of first vectors for a vector that is a nearest match to the second vector.

5. A method comprising:
   in a computing system:
      training a mapping between audio characteristics and visual characteristics, the training comprising determining audio characteristics and visual characteristics of each of a plurality of audiovisual files;
      determining audio characteristics of an audio play list; and
      generating, based on the mapping and the determined audio characteristics of the audio playlist, a video playlist to be played when the audio playlist is played, wherein the video playlist is complementary to the audio characteristics of the audio play list.

6. The method of claim 5, comprising combining the audio playlist with the generated video playlist into a single audiovisual file.

7. The method of claim 5, wherein the audio characteristics comprise one or more of: stabilized auditory image, Mel-frequency cepstral coefficients, or spectrograms.

8. The method of claim 5, wherein the visual characteristics comprise one or more of: color histograms and color textons.

9. The method of claim 5, wherein the training comprises vector quantizing the determined audio characteristics and visual characteristics of the plurality of audiovisual files to generate a plurality of vector pairs.

10. The method of claim 9, comprising vector quantizing the determined audio characteristics of the audio play list to generate a play list audio vector.

11. The method of claim 10, comprising:
    determining a nearest-matching vector pair of the plurality of vector pairs, the nearest-matching vector pair having an audio vector that nearest matches the playlist audio vector; and
    performing the generating the video playlist based on a video vector of the nearest-matching vector pair.

12. The method of claim 5 wherein the generating the video playlist comprises:
    selecting a plurality of images from a repository based on the mapping and based on determined visual characteristics of the selected plurality of images; and inserting the selected plurality of images sequentially along a timeline to generate the video playlist.

13. A system comprising:
a computing system configured to:
train a mapping between audio characteristics and visual characteristics, the training comprising determining audio characteristics and visual characteristics of each of a plurality of audiovisual files;
determine audio characteristics of an audio play list; and
generate, based on the mapping and the determined audio characteristics of the audio playlist, a video playlist to be played when the audio playlist is played, wherein the video playlist is complementary to the audio characteristics of the audio play list.

14. The system of claim 13, wherein the computing system is configured to combine the audio playlist with the generated video playlist into a single audiovisual file.

15. The system of claim 13, wherein the audio characteristics comprise one or more of: stabilized auditory image, Mel-frequency cepstral coefficients, or spectrograms.

16. The system of claim 15, wherein the visual characteristics comprise one or more of: color histograms and color textons.

17. The system of claim 16, wherein the training comprises vector quantizing the determined audio characteristics and visual characteristics of the plurality of audiovisual files to generate a plurality of vector pairs.

18. The system of claim 17, wherein the computing system is configured to vector quantize the determined audio characteristics of the audio playlist to generate a playlist audio vector.

19. The system of claim 18, wherein the computing system is configured to:
determine a nearest-matching vector pair of the plurality of vector pairs, the nearest-matching vector pair having an audio vector that nearest matches the playlist audio vector; and
perform the generation of the video play list based on a video vector of the nearest-matching vector pair.

20. The system of claim 13 wherein the generation of the video playlist comprises:
selection of a plurality of images from a repository based on the mapping and based on determined visual characteristics of the selected plurality of images; and
insertion of the selected plurality of images sequentially along a timeline to generate the video playlist.

* * * * *